(12) United States Patent
El Mourabit et al.

(10) Patent No.: US 10,130,932 B2
(45) Date of Patent: Nov. 20, 2018

(54) ORGANIC-INORGANIC HYBRID MATERIAL OF USE FOR EXTRACTING URANIUM (VI) FROM AQUEOUS MEDIA CONTAINING PHOSPHORIC ACID, PROCESSES FOR PREPARING SAME AND USES THEREOF

(71) Applicants: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR); UNIVERSITE MONTPELLIER 2 SCIENCES ET TECHNIQUES, Montpellier (FR)

(72) Inventors: Sabah El Mourabit, Sorgues (FR); Frédéric Goettmann, Les Angles (FR); Raphaël Turgis, Sabran (FR); Agnès Grandjean, Saint Marcel de Careiret (FR); Guilhem Arrachart, Saint-Laurent-des-Arbres (FR); Stéphane Pellet-Rostaing, Villeurbanne (FR)

(73) Assignees: COMMISSARIAT A L'ENERGIE ATOMIQUE ET AUX ÉNERGIES ALTERNATIVES, Paris (FR); CENTRE NATIONAL DE LA RECHERCHE SCIENTIFIQUE, Paris (FR); UNIVERSITE DE MONTPELLIER, Montpellier (FR)

( * ) Notice: Subject to any disclaimer, the term of this patent is extended or adjusted under 35 U.S.C. 154(b) by 617 days.

(21) Appl. No.: 14/769,846

(22) PCT Filed: Nov. 8, 2013

(86) PCT No.: PCT/EP2013/073429
§ 371 (c)(1),
(2) Date: Aug. 24, 2015

(87) PCT Pub. No.: WO2014/127860
PCT Pub. Date: Aug. 28, 2014

(65) Prior Publication Data
US 2016/0016150 A1 Jan. 21, 2016

(30) Foreign Application Priority Data
Feb. 25, 2013 (FR) ...................... 13 51639

(51) Int. Cl.
*B01J 20/00* (2006.01)
*B01J 20/32* (2006.01)
(Continued)

(52) U.S. Cl.
CPC ..... *B01J 20/3251* (2013.01); *B01J 20/28083* (2013.01); *B01J 20/28085* (2013.01); *B01J 20/3204* (2013.01); *B01J 20/3219* (2013.01); *B01J 20/3259* (2013.01); *B01J 45/00* (2013.01); *C22B 60/0269* (2013.01); *C22B 60/0273* (2013.01); *C22B 60/0282* (2013.01)

(58) Field of Classification Search
CPC ............... B01J 20/28083; B01J 20/28085; B01J 20/22; B01J 20/3259; B01J 20/3219; B01J 20/3204; B01J 20/3251; B01J 45/00; C22B 60/0269; C22B 60/0282; C22B 60/0234; C22B 60/0252; C22B 60/0273; C22B 3/42
USPC ............... 423/6; 210/679, 682; 252/184; 502/401, 405, 407-413, 416
See application file for complete search history.

(56) References Cited

U.S. PATENT DOCUMENTS 4,396,556 A 8/1983 Kem
4,599,221 A 7/1986 Ketzinel et al.
(Continued)

FOREIGN PATENT DOCUMENTS

WO 2011056288 A1 5/2011

OTHER PUBLICATIONS

Sawicki et al, "Discovery of powerful uranyl ligands from efficient synthesis and screening" Chem. Eur. J. 2005, 11, 3689-97. (Year: 2005).*

(Continued)

*Primary Examiner* — Steven J Bos
(74) *Attorney, Agent, or Firm* — Pearne & Gordon LLP

(57) ABSTRACT

The invention relates to an organic-inorganic hybrid material which comprises an inorganic solid support on which are grafted organic molecules of the general formula (I) hereafter:

Figure 1:
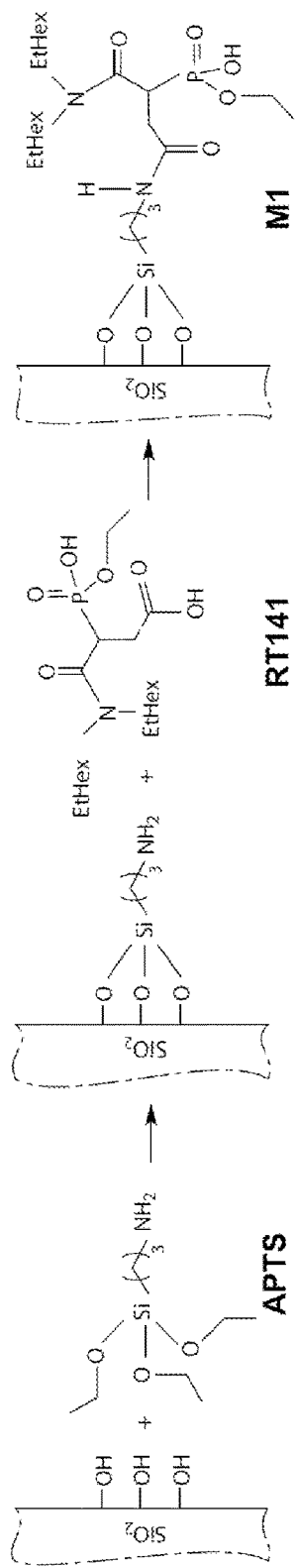

and relates to methods allowing preparation of this hybrid material as well as to the uses of the hybrid material for extracting uranium(VI) from an aqueous medium comprising phosphoric acid.

20 Claims, 2 Drawing Sheets

(51) Int. Cl.
*B01J 45/00* (2006.01)
*C22B 60/02* (2006.01)
*B01J 20/28* (2006.01)

(56) References Cited

U.S. PATENT DOCUMENTS

| | | | |
|---|---|---|---|
| 9,441,285 B2* | 9/2016 | Arrachart | C22B 60/0243 |
| 2009/0026138 A1 | 1/2009 | Bernier et al. | |
| 2009/0093664 A1 | 4/2009 | Wang | |
| 2012/0055860 A1* | 3/2012 | Wyndham | B01J 20/286 210/198.3 |
| 2013/0102459 A1* | 4/2013 | Wei | B01J 20/223 502/401 |
| 2015/0133688 A1 | 5/2015 | Arrachart et al. | |

OTHER PUBLICATIONS

Addleman, R., et al., "Preconcentration and assay of radionuclides with self assembled monolayers on mesoporous supports", "Journal of Radioanalytical and Nuclear Chemistry", Jan. 2005, pp. 59-64, vol. 263, No. 1.

Ahmed, S., et al., "Uranium extraction from sulfuric acid medium using trioctylamine impregnated activated carbon", "Hydrometallurgy", Feb. 15, 2013, pp. 150-157, vol. 134-135.

Donia, A., et al, "Selective separation of U(VI) from its solutions using amine modified silica gel produced from leached zircon", "International Journal of Mineral Processing", Aug. 7, 2011, pp. 81-88, vol. 101.

Fryxell, G., et al., "Lanthanide selective sorbents: self-assembled monolayers on mesoporous supports (SAMMS)", "Journal of Materials Chemistry", Sep. 14, 2004, pp. 3356-3363, vol. 14.

Fryxell, G., et al., "Actinide sequestration using self-assembled monolayers on mesoporous supports.", "Environ. Sci. Technol.", Mar. 1, 2005, pp. 1324-1331, vol. 39, No. 5.

Gonzalez-Luque, S., et al., "Uranium sorption from phosphoric acid solutions using selective ion exchange resins: Part II. Kinetic studies", "Hydrometallurgy", Oct. 1983, pp. 227-245, vol. 11.

Hurst, F., et al., "Recovery of Uranium from Wet-Process Phosphoric Acid", "Ind. Eng. Chem. Process Des. Dev"., Jan. 1972, pp. 122-128, vol. 11, No. 1.

Jun, S., et al., "Synthesis of New, Nanoporous Carbon with Hexagonally Ordered Mesostructure", "J. Am. Chem. Soc.", Oct. 12, 2000, pp. 10712-10713, vol. 122.

Kabay, N., et al., "Recovery of Uranium from Phosphoric Acid Solutions Using Chelating Ion-Exchange Resins", "Ind. Eng. Chem. Res.", Apr. 7, 1998, pp. 1983-1990, vol. 37.

Lebed, P., et al., "Large Pore Mesostructured Organosilica-Phosphonate Hybrids as Highly Efficient and Regenerable Sorbents for Uranium Sequestration", "Chem. Mater.", Oct. 1, 2012, pp. 4166-4176, vol. 24.

Sadeghi, S., et al., "Magnetic nanoparticles with an imprinted polymer coating for the selective extraction of uranyl ions", "Microchim Acta", Apr. 20, 2012, pp. 89-97, vol. 178.

Yuan, L., et al., "High performance of phosphonate-functionalized mesoporous silica for U(VI) sorption from aqueous solution", "Dalton Transations", Jun. 17, 2011, pp. 7446-7453, vol. 40.

Yuan, L., et al., "A novel mesoporous material for uranium extraction, dihydroimidazole functionalized SBA-15", "Journal of Materials Chemistry", Jun. 27, 2012, pp. 17019-17026, vol. 22.

Zhao, D., et al., "Triblock copolymer syntheses of mesoporous silica with periodic 50 to 300 angstrom pores", "Science", Jan. 23, 1998, pp. 548-552, vol. 279.

\* cited by examiner

EthHex = 2ethylhexyl

ORGANIC-INORGANIC HYBRID MATERIAL OF USE FOR EXTRACTING URANIUM (VI) FROM AQUEOUS MEDIA CONTAINING PHOSPHORIC ACID, PROCESSES FOR PREPARING SAME AND USES THEREOF

CROSS-REFERENCE TO RELATED APPLICATIONS

This application is a U.S. national phase under the provisions of 35 U.S.C. § 371 of International Patent Application No. PCT/EP13/73429 filed Nov. 8, 2013, which in turn claims priority of French Patent Application No. 1351639 filed Feb. 25, 2013. The disclosures of such international patent application and French priority patent application are hereby incorporated herein by reference in their respective entireties, for all purposes.

TECHNICAL FIELD

The invention relates to the field of extraction of uranium (VI) from aqueous media containing phosphoric acid.

More specifically, the invention relates to an organic-inorganic hybrid material which allows extraction of uranium(VI) present in an aqueous medium comprising phosphoric acid and this, both very efficiently and with high selectivity towards the other metal cations which may be present in this medium and in particular, towards iron(III).

It also relates to methods which allow preparation of this organic-inorganic hybrid material.

It also relates to the uses of this organic-inorganic hybrid material for extracting uranium(VI) from an aqueous medium comprising, in addition to this uranium, phosphoric acid such as a solution from the attack of a natural phosphate with sulfuric acid and this, whether the purpose is to subsequently add value to this uranium or, on the contrary, treat it as a waste.

The invention notably finds application in the treatment of natural phosphates.

STATE OF THE PRIOR ART

Natural phosphates (or phosphate ores) which are used for making phosphoric acid and fertilizers, contain uranium at contents which may vary from a few tens of ppm to several thousands of ppm as well as variable amounts of other metals.

The uranium present in natural phosphates is almost entirely found again in the aqueous solutions of phosphoric acid which stem from the sulfuric attack of these phosphates.

The potential for recovering the uranium contained in these phosphate ores is of 14,000 metric tons/year, i.e. about 25% of the present yearly production of uranium, which represents a non-negligible uranium supply source.

Also, many research teams have been interested in the problem of recovering uranium from an aqueous solution of phosphoric acid.

Three main techniques have been proposed to this day, i.e.:

1°) the liquid-liquid extraction, which consists of extracting uranium from the aqueous solution of phosphoric acid by putting this aqueous solution in contact with an organic solution which comprises one or several specific extracting agents such as, for example, a mixture of di-2-(ethylhexyl) phosphoric acid (or HDEHP) and of trioctylphosphine oxide (or TOPO), in solution in an organic diluent such, as for example, n-dodecane. This technique is efficient and relatively simple to apply, which results in the fact that to this day, it is the only one which has been applied industrially, known under the name of the URPHOS method (cf., for example, Hurst et al., *Industrial & Engineering Chemistry Process Design and Development* 1972, 11(1), 122-128, reference [1]). However, it requires the use of significant volumes of organic solutions which, after having stripped the uranium for recovering it, should be washed with different aqueous solutions in order to be able to reuse them, which makes it a technique not very adapted to dry climate conditions which prevail in a certain number of regions with mines of natural phosphates. Further, the problem is posed of a possible contamination of the uranium with chemical species stemming from the organic solutions.

2°) co-precipitation, which consists of forming in situ, i.e. in the aqueous solution of phosphoric acid, solid particles which comprise the uranium which one seeks to recover, by adding a chemical species in solution and then after decantation and filtration, by collecting these solid particles. This technique is efficient but it is relatively expensive because of the many treatments to which the co-precipitates then have to be subject in order to recover the uranium alone.

3°) solid-liquid extraction, which consists of extracting uranium from the aqueous solution of phosphoric acid by putting this aqueous solution in contact with a resin formed by an organic polymer insoluble in water which includes chemical groups capable of retaining the uranium either by ion exchange or by complexation. Thus resins bearing aminophosphonic, hydroxyphosphonic, phosphonic or polyfunctional sulfonic/phosphonic acid groups (cf, for example, Gonzalez-Luque and Streat, *Hydrometallurgy* 1983, 11(2), 207-225, reference [2]; Ketzinel, U.S. Pat. No. 4,599,221, reference [3]; Kabay et al., *Industrial & Engineering Chemistry Research* 1998, 37(5), 1983-1990, reference [4]) have been proposed.

The solid-liquid extraction has the advantage over the liquid-liquid extraction of not using organic solutions and therefore being without the different drawbacks related to the use of this type of solutions. However, it is found that the applications of resins which have been proposed to this day for extracting uranium from an aqueous solution of phosphoric acid are very limited because:

(1) most of these resins require that the uranium, which is naturally present in the state of oxidation VI in aqueous solutions of phosphoric acid stemming from the sulfuric attack of natural phosphates, be reduced beforehand to the state of oxidation IV;

(2) their capability of selectively retaining the uranium is generally low; and (3) because of their organic nature, they tend to swell and float in the aqueous medium, which is an obstacle to their use in equipment which is typically used for carrying out continuous solid-liquid extractions such as fluidized beds.

Moreover materials with an organic solid support are known, which are more stable chemically than the materials with an organic solid support and which have consequently given rise recently to a certain number of studies as to the possibility of using them for extracting uranium from aqueous acid solutions, typically nitric solutions.

Thus the following were notably proposed:

materials with an inorganic support functionalized by molecules with amine groups (Donia et al., *International Journal of Mineral Processing* 2011, 101(1-4), 81-88, reference [5]; Sadeghi et al., *Microchemica Acta* 2012, 178(1-2), 89-97, reference [6]), or impregnated with trioctylamine (Ahmed et al., *Hydrometallurgy* 2013, 134-135(0), 150-157, reference [7]); however these materials prove to be not selective for uranium towards the other metal cations;

materials with an inorganic support functionalized with molecules with phosphorus-containing groups: for example, Lebed et al. (*Chemistry of Materials* 2012, 24(21), 4166-4176, reference [8]) have proposed a mesoporous silica functionalized with ethyltriethoxysilane diethylphosphonate groups at the surface of the pores of this silica, while Yuan et al. (*Dalton Transactions* 2011, 40(28), 7446-7453, reference [9]) have proposed a mesoporous silica functionalized with diethylphosphato-ethyltriethoxysilane groups; however, in addition to the fact that the extraction tests described in both of these references were conducted without competing ions, their results show a low performance of the materials at pH 2; and materials with an inorganic support functionalized with molecules of the glycinylurea, salicylamide, acetamide phosphonate type (Fryxell et al., *Environmental Science & Technology* 2005, 39(5), 1324-1331, reference [10]) or further of the dihydroimidazole type (Yuan et al., *Journal of Materials Chemistry* 2012, 22(33), 17019-17026, reference [11]); however, the extraction tests described in these references are not poorly conclusive, either because the extraction of the uranium is very low or even zero at pHs of the order of 2, or because the selectivity of the extraction of uranium is not very selective, notably towards iron (reference [10]).

The inventors therefore set the goal of providing novel materials which allow extraction by the solid-liquid extraction technique, of uranium(VI) present in an aqueous medium comprising phosphoric acid and which are generally without the drawbacks which the solid materials proposed up to now have for applying this technique.

More specifically, the inventors set the goal that these novel materials allow extraction of uranium(VI) from an aqueous medium comprising phosphoric acid, very efficiently and with high selectivity towards the other metal cations which may be present in this solution and, in particular towards iron(III) and this, without it being necessary to subject beforehand this uranium to any reduction treatment.

They also set the goal that these novel materials be stable in an aqueous medium and that their preparation be relatively simple to apply, notably because it only requires reactions which are conventionally applied in the field of synthesis chemistry.

DISCUSSION OF THE INVENTION

These objects and further ones are achieved by the invention which firstly proposes an organic-inorganic hybrid material, which comprises an inorganic solid support on which is covalently grafted a plurality of organic molecules fitting the general formula (I) hereafter:

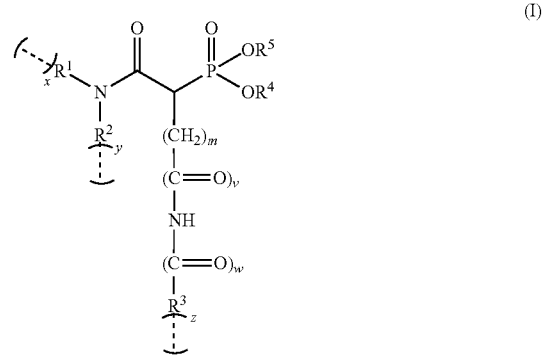

wherein:
x, y and z are equal to 0 or 1, with the proviso that at least one of x, y and z is equal to 1;
m is an integer ranging from 1 to 6;
v and w are equal to 0 or 1, with the proviso that v is equal to 1 when w is equal to 0 and that v is equal to 0 when w is equal to 1;
if x equals 0, R1 represents a hydrogen atom or a saturated or unsaturated, linear or branched hydrocarbon group comprising from 1 to 12 carbon atoms, while, if x is equal to 1, R1 represents a group bound to the inorganic solid support through at least one covalent bond (represented by the dotted line);
if y is equal to 0, R2 represents a hydrogen atom or a saturated or unsaturated, linear or branched hydrocarbon group comprising from 1 to 12 carbon atoms, while, if y is equal to 1, R2 represents a group bound to the inorganic solid support through at least one covalent bond (represented by the dotted line);
if z is equal to 0, R3 represents a hydrogen atom or a saturated or unsaturated, linear or branched hydrocarbon group comprising from 1 to 12 carbon atoms, while, if z is equal to 1, R3 represents a group bound to the inorganic solid support through at least one covalent bond (represented by the dotted line);
$R^4$ and $R^5$ represent independently of each other, a hydrogen atom, a saturated or unsaturated, linear or branched hydrocarbon group comprising from 2 to 8 carbon atoms, or a monocyclic aromatic group.

Thus, the organic-inorganic hybrid material according to the invention comprises a solid support of an inorganic nature (which is therefore chemically more stable than are typically organic supports), on which are attached in a covalent way molecules which, themselves, are of an organic nature and comprise a diamidophosphonate unit which is capable of complexing uranium(VI) when the latter is present in an aqueous medium comprising phosphoric acid and of retaining it by this complexation mechanism.

Within the scope of the present invention, is considered as "inorganic", any element (compound, material, etc.) which is able to be broken down at a temperature above 800° C., while is considered as "organic" any element which is able to break down at a temperature below or equal to 800° C.

By "saturated or unsaturated, linear or branched hydrocarbon group comprising from 1 to 12 carbon atoms" is meant any alkyl, alkenyl or alkynyl group with a linear or branched chain, which comprises at least 1 carbon atom but which does not comprise more than 12 carbon atoms. Such a group may therefore comprise 1 carbon atom, 2 carbon atoms, 3 carbon atoms, 4 carbon atoms, etc., up to 12 carbon atoms inclusive.

In a similar way, by "saturated or unsaturated, linear or branched hydrocarbon group comprising from 2 to 8 carbon atoms" is meant any alkyl, alkenyl or alkynyl group with a linear or branched chain, which comprises at least 2 carbon atoms but which does not comprise more than 8 carbon atoms. Such a group may therefore comprise 2 carbon atoms, 3 carbon atoms, 4 carbon atoms, etc., up to 8 carbon atoms inclusive.

By "monocyclic aromatic group" is meant any group with a single ring and for which the ring meets the Hückel aromaticity rule and therefore has a number of delocalized π electrons equal to 4n+2, for example a phenyl or benzyl group.

According to the invention, the inorganic solid support may be formed by any inorganic solid material on which it is possible to covalently bind organic molecules with one or several chemical reactions.

Thus, the inorganic solid support may notably be based (1) on a metal oxide and, in particular, on a transition metal oxide like a titanium oxide or a zirconium oxide (or zirconia), a post-transition metal oxide such as an aluminium oxide (or alumina), a metalloid oxide such as a silicon oxide (or silica), a silica glass or a germanium oxide, (2) on a metal mixed oxide such an aluminosilicate, an aluminosilicate glass, a zirconium silicate, a tin silicate or a cerium silicate, (3) a mixture of metal oxides such as a borosilicate or a borosilicate glass, or (4) on carbon (graphite, fullerenes including nanotubes, mesoporous carbon, . . . ), and may be in a great diversity of shapes (particles, granules, beads, membranes, fibers, felts, . . . ), of (nano-, micro- or macroscopic) sizes and structures (either porous or not, with interconnected pores or not, either ordered or not, . . . ).

However, in order to optimize the extraction performances of the organic-inorganic hybrid material according to the invention, it is preferred that the inorganic solid support has (after grafting of the organic molecules) a specific surface area greater than or equal to 100 m²/g (as determined by adsorption-desorption of gas with the BET method), which is made possible by the use of a porous material.

This porous material may be a microporous material, i.e. a material for which the diameter of the pores is less than 2 nm (according to the definition of the International Union of Pure and Applied Chemistry), a mesoporous material, i.e. a material for which the diameter of the pores is comprised between 2 and 50 nm (also according to the definition of the IUPAC), a macroporous material, i.e. a material for which the diameter of the pores is greater than 50 nm (always according to the definition of the IUPAC), or further a material with double porosity, for example both mesoporous and macroporous, or even with triple porosity. It may moreover be ordered or disordered.

As non-limiting examples of materials which may be suitable, mention may notably be made of ordered mesoporous silicas such as silicas of the MCM and SBA type, disordered porous silicas such as the porous silica glasses of the VYCOR™ type (notably available from Corning), mesoporous titanium oxides, mesoporous zirconias, ordered porous carbons such as mesoporous carbons of the CMK type and carbon nanotubes, and disordered porous carbons such as active coals.

Preferably, the inorganic solid support consists of a mesoporous or macroporous material and is, in particular, selected from mesoporous silicas, mesoporous titanium oxides, mesoporous zirconias and mesoporous carbons.

From among these materials, mesoporous silicas and mesoporous carbons are most particularly preferred, in particular ordered mesoporous silicas of the SBA type and ordered mesoporous carbons of the CMK type.

According to the invention, the organic molecules may be grafted on the inorganic solid support via $R^3$, in which case $R^3$ preferably represents a group of formula —$(CH_2)_q$—$X^1$— wherein q is an integer ranging from 0 to 12, while $X^1$ represents a group selected from the groups:

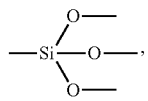

more simply written as —$SiO_3$— hereafter;

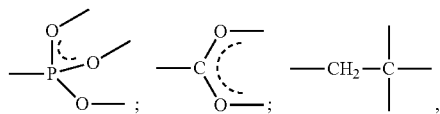

more simply written as —$CH_2$—C— hereafter; and
—CH=CH—;
depending on the nature of the inorganic solid support.

It should be well understood that, when $R^3$ represents a group of formula —$(CH_2)_q$—$X^1$—, the covalent bond(s) between $R^3$ and the inorganic solid support is (are) ensured by the group —$X^1$— and not by the group —$(CH_2)_q$—.

Alternatively or additionally, the organic molecules may also be grafted to the inorganic solid support via at least one of $R^1$ and $R^2$, in which case $R^1$ and/or $R^2$ represent(s), preferably, a group of formula (a), (b), (c), (d), (e), (f) or (g) hereafter:

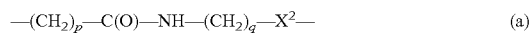 (a)

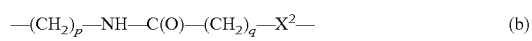 (b)

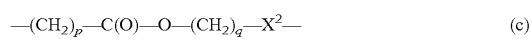 (c)

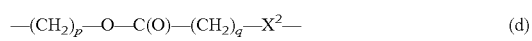 (d)

 (e)

 (f)

 (g)

wherein p is an integer ranging from 1 to 6, q is an integer ranging from 0 to 12, while $X^2$ represents a group selected from the groups:

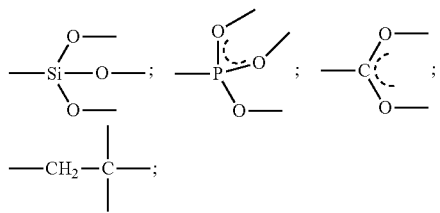

There also, it should be well understood that, when $R^1$ and/or $R^2$ represent(s) a group of formula (a), (b), (c), (d), (e), (f) or (g) hereinbefore, the covalent bond(s) existing between $R^1$ and/or $R^2$ on the one hand and the inorganic solid support on the other hand, is (are) ensured by the group —$X^2$— and not by the group —$(CH_2)_p$—.

In the case when the organic molecules are grafted on the inorganic solid support both via $R^3$ and via at least one of $R^1$ and $R^2$, then $X^1$ (which belongs to $R^3$) is preferably identical with $X^2$ (which belongs to $R^1$ and/or $R^2$). Thus, for example, if $R^3$ represents a group —$(CH_2)_q$—$SiO_3$—, then $R^1$ and/or $R^2$ may fit any of the formulae (a) to (g) hereinbefore but wherein $X^2$ preferentially represents a group —$SiO_3$—. Similarly, if $R^3$ represents a group —$(CH_2)_q$—$CH_2$—C—, then $R^1$ and/or $R^2$ may fit any of the formulae (a) to (g) hereinbefore but wherein $X^2$ preferentially represents a group —$CH_2$—C—.

According to the invention, the organic molecules preferably fit the general formula (I) hereinbefore wherein v is equal to 1, w is equal to 0, in which case these organic molecules fit the particular formula (Ia) hereafter:

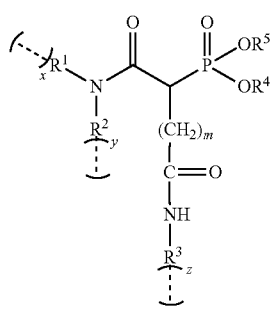

(Ia)

wherein x, y, z, m, $R^1$, $R^2$, $R^3$, $R^4$ and $R^5$ have the same meaning as earlier.

Still further, molecules of the particular formula (Ia) hereinbefore wherein x and y have the value 0, $R^1$ and $R^2$ represent, independently of each other, a linear or branched alkyl group comprising from 1 to 12 carbon atoms; z is 1 and $R^3$ represents a group bound to the inorganic solid support through at least one covalent bond, while $R^4$ and $R^5$ represent, independently of each other, a hydrogen atom or a linear or branched alkyl group comprising from 2 to 8 carbon atoms, are preferred.

Advantageously, $R^1$ and $R^2$ are identical with each other and represent a branched alkyl group comprising from 6 to 12 carbon atoms, the group 2-ethylhexyl being most particularly preferred.

As for $R^4$ and $R^5$, they preferentially represent, independently of each other, a hydrogen atom or a linear or branched alkyl group comprising from 2 to 4 carbon atoms such as an ethyl, n-propyl, isopropyl, n-butyl, sec-butyl, isobutyl or tert-butyl group, the ethyl and n-butyl groups being most particularly preferred among these alkyl groups.

According to a particularly preferred arrangement, the inorganic solid support is based on a metal oxide, on a metal mixed oxide or on a mixture of metal oxides, in which case $R^3$ represents a group of formula —$(CH_2)_q$—$SiO_3$— wherein q is 1 to 5.

Alternatively, the inorganic solid support is based on carbon, in which case $R^3$ represents a group of formula —$(CH_2)_q$—$CH_2$—C— wherein q is 0 to 5.

According to the invention, the covalent grafting of the organic molecules on the inorganic solid support may be obtained by a method in a single step, which consists of reacting one or several reactive functions F1 belonging to the inorganic solid support with one or several reactive functions F2 of an organic compound which comprises, in addition to these reactive functions F2, the diamidophosphonate complexing unit, so as to obtain the covalent binding of this organic compound on the inorganic solid support by reaction of the reactive functions F1 and F2 with each other. In this case, the organic molecules of general formula (I) hereinbefore corresponds to what is left of the organic compound after the reactive functions F1 and F2 have reacted together.

Thus, for example, in the case when the inorganic solid support is based on silica, the covalent grafting of the organic molecules on the inorganic solid support may be obtained by reacting silanol functions (—SiOH) of the silica with a trialkoxy function (for example, trimethoxy-, triethoxy- or tripropoxy-silane function) of an organic compound which also comprises the diamidophosphonate complexing unit.

Alternatively, the grafting of the organic molecules on the inorganic solid support may be obtained by a method in two steps, which consists of:
  firstly reacting one or several reactive functions F1 belonging to the inorganic solid support with one or several reactive functions F2 of a first organic compound, which comprises two different types of reactive functions, F2 and F3 respectively, so as to obtain the covalent binding of the first organic compound on the inorganic solid support by reaction of said reactive functions F1 and F2 with each other and functionalization of the inorganic solid support with the reactive function(s) F3; and then
  subsequently reacting this or these reactive functions F3 with one or several reactive functions F4 belonging to a second organic compound which comprises, in addition to these reactive functions F4, the diamidophosphonate complexing unit, so as to obtain the covalent binding of the second organic compound on the first by reaction of said reactive functions F3 and F4 with each other. In this case, the organic molecules of general formula (I) hereinbefore correspond to the molecular assembly formed by what is left of the first and second organic compounds after the reactive functions F1 and F2, and then F3 and F4 ave reacted together.

This second way of proceeding is well adapted to grafting organic molecules on inorganic solid supports based on one or several metal oxides or on carbon and will therefore be preferred for these type of supports.

Thus, for example, in the case when the inorganic solid support is based on silica, the covalent grafting of the organic molecules on the inorganic solid support may be obtained by firstly reacting the silanol functions (—SiOH) of the silica with a trialkoxysilane function of a first organic compound which also comprises an amine function, and then reacting this amine function with the carboxylic acid function of a second organic compound which also comprises the diamidophosphonate complexing unit.

The organic-inorganic hybrid material according to the invention has particularly high affinity and selectivity for uranium(VI) when it is present in an aqueous medium comprising phosphoric acid.

Also, the invention further has the object of using an organic-inorganic hybrid material as defined earlier for extracting uranium(VI) from an aqueous medium comprising phosphoric acid and wherein this uranium is present.

According to the invention, this aqueous medium may comprise phosphoric acid in a very large range of concentrations and in particular from 0.01 to 9 mol/L of phosphoric acid.

Such an aqueous medium may notably be an aqueous solution resulting from the attack of a natural phosphate with sulfuric acid.

The extraction of uranium(VI) from an aqueous medium by means of an organic-inorganic hybrid material is extremely simple to apply since it is sufficient to put this material in contact with the aqueous medium, for example in a reactor with stirring or in a column, for a sufficient time in order to allow uranium(VI) to be complexed by the material, and then for separating the latter from the aqueous medium. Typically, 0.01 to 1 L of aqueous solution will be used for 0.05 to 5 kg of material.

According to the goal in which uranium(VI) is extracted from the aqueous medium (recovery of the uranium with view to increasing its value or purification of the aqueous medium as regards uranium), it is then possible either to strip uranium(VI) of the organic-inorganic hybrid material, for example by means of a basic aqueous solution of the potash aqueous solution type for recovering it with view to adding value to it, or treating the organic-inorganic hybrid material as a waste.

Also, the object of the invention is further a method for recovering uranium(VI) present in an aqueous medium comprising phosphoric acid, which method comprises:

a) extracting uranium(VI) from the aqueous medium, by putting this aqueous medium in contact with an organic-inorganic hybrid material as defined earlier, and then separating of the aqueous medium and the organic-inorganic hybrid material; and b) stripping of uranium(VI) from the organic-inorganic hybrid material obtained at the end of step a) by putting the organic-inorganic hybrid material in contact with a basic aqueous solution, for example a potash aqueous solution, and then separating the organic-inorganic hybrid material and the basic aqueous solution.

In this method, the aqueous medium comprising phosphoric acid which is used in step a) is advantageously an aqueous solution resulting from the attack of natural phosphate with sulfuric acid.

Other features and advantages of the invention will become better apparent upon reading the description addition which follows, which relates to examples for preparing organic-inorganic hybrid materials according to the invention as well as to examples for demonstrating the properties of these materials.

Of course, these examples are only given as illustrations of the object of the invention and by no means are a limitation of this object.

SHORT DESCRIPTION OF THE DRAWINGS

FIG. 1 schematically illustrates the preparation of a first organic-inorganic hybrid material according to the invention, in which the inorganic solid support is a mesoporous silica and in which the organic molecules fit the general formula (I) hereinbefore in which $R^1$ and $R^2$ both represent a 2-ethylhexyl group, $R^3$ represents a group —$(CH_2)_3$—$SiO_3$—, $R^4$ represents an ethyl group, while $R^5$ represents a hydrogen atom.

Figure 2:
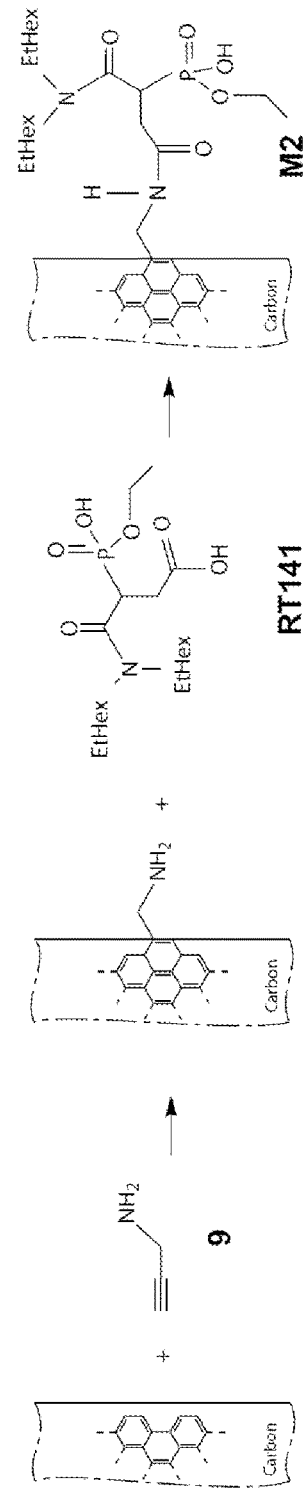

FIG. 2 schematically illustrates the preparation of a second organic-inorganic hybrid material according to the invention in which the inorganic solid support is a mesoporous carbon and in which the organic molecules fit the general formula (I) hereinbefore wherein $R^1$ and $R^2$ both represent a 2-ethylhexyl group, $R^3$ represents a group —$CH_2$—$C$—, $R^4$ represents an ethyl group, while $R^5$ represents a hydrogen atom.

Figure 3:
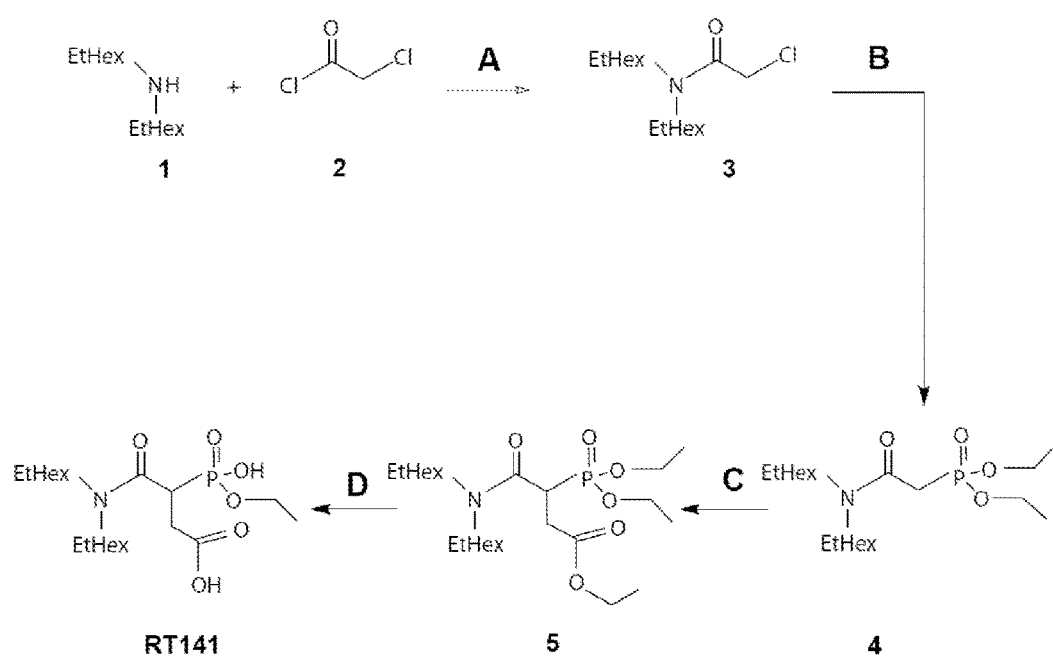

FIG. 3 schematically illustrates the reaction schemes of the synthesis of organic compounds useful for preparing the organic-inorganic hybrid materials shown in FIGS. 1 and 2.

DETAILED DISCUSSION OF PARTICULAR EMBODIMENTS

EXAMPLE 1

Preparation of a First Organic-Inorganic Hybrid Material According to the Invention A first organic-inorganic hybrid material according to the invention is prepared, called hereafter material M1, which comprises a mesoporous silica with a hexagonal periodic structure, of the SBA-15 type, on which are grafted organic molecules fitting the general formula (I) hereinbefore wherein:

m is 1;
v is 1 (and therefore w is 0);
$R^1$ and $R^2$ both represent a 2-ethylhexyl group,
$R^3$ represents a group —$(CH_2)_3$—$SiO_3$—,
$R^4$ represents an ethyl group, while
$R^5$ represents a hydrogen atom.

This organic-inorganic hybrid material is prepared by the method illustrated in FIG. 1, which comprises:

(1) the functionalization of the mesoporous silica with amine functions, which is achieved by a silanization reaction, i.e. by reacting silanol functions (Si—OH) of this silica with ethoxysilane functions of the 3-amino-propyl-triethoxysilane (commercially available), noted as APTS in FIG. 1; and then (2) the grafting of 3-(N,N-di(2-ethylhexyl)carbamoyl)-3-(ethoxy)-hydroxyphosphono)propanoic acid, or compound RT141, on the amine functions of the thereby functionalized silica, which is achieved by a peptide coupling, i.e. by reacting said amine functions with the carboxylic acid functions of this compound.

1.1—Synthesis of the Mesoporous Silica

The mesoporous silica is synthesized by following an operating procedure identical with the one described by Zhao et al. in *Science* 1998, 279, 548-552, reference [12]. It has pores with a diameter of 9.1 nm (as determined according to the BJH method) and a BET specific surface area of 800 $m^2/g$ (as determined by adsorption-desorption of nitrogen).

1.2—Functionalization of the Mesoporous Silica

After activation (i.e. heating in vacuo to 130° C. for 24 hours), the mesoporous silica (1.8 g) is suspended in a solution containing 0.5 g of 3-aminopropyltriethoxysilane in 20 mL of toluene. The mixture is heated to 90° C. for 48 hours under nitrogen, and then filtered and washed with acetone before being treated with acetone in the Soxhlet apparatus for 48 hours. The thereby obtained aminosilica is dried in the oven (80° C.) for 20 hours.

Its physico-chemical characteristics are the following:
pore diameter (BJH method): 8.4 nm;
BET specific surface area (nitrogen adsorption-desorption): 460 $m^2/g$;
mass loss (ATG analysis): 9%;
elementary analysis, found: C, 5.0%, N, 1.7%, P, 0%.
amount of grafted amine functions: 1.4 mmol/g of mesoporous silica.

1.3—Synthesis of the RT141 Compound

The RT141 compound is synthesized by using the reaction scheme comprising the steps A, B, C and D, which is illustrated in FIG. 3.

As visible in this figure, this synthesis consists of reacting in a first step, noted as A, 2,2'-diethylhexylamine, noted as 1, with chloroacetyl chloride, noted as 2, in order to obtain 2-chloro-N,N-diethylhexylacetamide, noted as 3 in this figure.

To do this, to a solution of 2,2'-diethylhexylamine at 0.7 mol/L in dichloromethane, potassium carbonate (2 equiv.) is added with stirring. The thereby obtained suspension is cooled to 0° C. and chloroacetyl chloride is added to it drop wise (1.5 equiv.). The mixture is left to return to room temperature. Once the amine is consumed (which may be checked by thin layer chromatography (TLC) by using ethyl acetate as an eluent and ninhydrin as a developer), 4 equivalents of water are added drop wise to the mixture, which produces effervescence. When this effervescence is completed, an amount of water equal to half the volume of dichloromethane having been used for dissolving the amine is added to this mixture. The mixture is maintained with stirring for 15 minutes. The aqueous and organic phases are then separated and the organic phase is dried on $Na_2SO_4$, filtered and concentrated. The expected compound (yield: 97%) is thereby obtained, for which the characterizations by $^1H$ and $^{13}C$ NMR are given hereafter.

$^1H$ NMR (400 MHz, $CDCl_3$) δ (ppm): 0.85-0.91 (m, 12H, $CH_3$); 1.23-1.33 (m, 16H, $CH_2$); 1.55-1.60 (m, 1H, CH—$CH_2$—N); 1.67-1.73 (m, 1H, CH—$CH_2$—N); 3.18 (d, 2H, J=7.5 Hz, $CH_2$—N); 3.22-3.32 (m, 2H, $CH_2$—N); 4.09 (s, 2H, $CH_2$—Cl);

$^{13}C$ NMR (100 MHz, $CDCl_3$) δ (ppm): 10.7; 11.0; 14.1 ($CH_3$); 23.1; 23.9; 24.0; 28.7; 28.9; 30.4; 30.6 ($CH_2$); 36.8; 38.5 (CH); 41.6 ($CH_2$—Cl); 48.8 ($CH_2$—N); 51.7 ($CH_2$—N); 167.1 (C=O).

In a second step, noted as B in FIG. 3, 2-chloro-N,N-diethylhexyl-acetamide is subject to an Arbuzov reaction in order to obtain diethyl 1-(N,N-diethyl-hexylcarbamoyl) methylphosphonate, noted as 4 in this figure.

This Arbuzov reaction is conducted by bringing a mixture consisting of 2-chloro-N,N-diethylhexylacetamide (1 equiv.) and of triethylphosphite (1.2 equiv.) at 160° C. with reflux for 3 hours. Once the acetamide is consumed (which is checked by TLC by using dichloromethane as an eluent and UV or phosphomolybdic acid as a developer), the phosphite excess is distilled under reduced pressure. The expected compound is thereby obtained (yield: quantitative) for which the characterizations by $^1H$, $^{13}C$ and $^{31}P$ NMR are given hereafter.

$^1H$ NMR (400 MHz, $CDCl_3$) δ (ppm): 0.81-0.86 (m, 12H, $CH_3$); 1.21-1.32 (m, 22H, $CH_2$, O—$CH_2$—$CH_3$); 1.51-1.57 (m, 1H, CH—$CH_2$—N); 1.64-1.71 (m, 1H, CH—$CH_2$—N); 3.02 (d, 2H, J=22.0 Hz, CO—$CH_2$—P); 3.21-3.27 (m, 4H, $CH_2$—N); 4.08-4.16 (m, 4H, O—$CH_2$—$CH_3$);

$^{13}C$ NMR (100 MHz, $CDCl_3$) δ (ppm): 10.6; 11.0; 14.1; 14.2 ($CH_3$); 16.3; 16.4 (O—$CH_2$—$CH_3$); 23.1; 23.2; 23.5; 23.9; 28.8; 28.9; 30.4; 30.6 ($CH_2$); 33.1; 34.5 (d, J=134.0 Hz, $CH_2$—P); 37.0; 38.6 (CH); 48.9; 52.3 ($CH_2$—N); 62.5 (d, J=6.5 Hz, O—$CH_2$—$CH_3$); 165.2 (d, J=6.0 Hz, C=O);

$^{31}P$ NMR (160 MHz, $CDCl_3$) δ (ppm): 21.8.

In a third step, noted as C in FIG. 3, the diethyl 1-(N,N-diethylhexyl-carbamoyl)methylphosphonate is subject to a C-alkylation reaction in order to obtain the ethyl 3-(N,N-di (2-ethylhexyl)carbamoyl)-3-(diethoxy)phosphono)propanoate, noted as 5 in this figure.

To do this, a solution of diethyl 1-(N,N-diethylhexylcarbamoyl)-methylphosphonate (dried beforehand for 2.5 hours at 80° C. in vacuo) is added dropwise and with stirring in anhydrous tetrahydrofuran (THF—1 equiv.—1 mol/L) to a suspension of sodium hydride (1.5 equiv.—washed beforehand with pentane) in anhydrous THF (2 mol/L). The mixture is stirred for 1 hour at room temperature and the solution is then cooled to 0° C. and a solution of ethyl acetate bromide (1.5 equiv.) is added drop wise. This mixture is left to return to room temperature which is then stirred for 1 hour, after which the crude product is acidified down to a pH of 1 by means of an aqueous solution of hydrochloric acid at 1 mol/L and extracted with dichloromethane. The aqueous and organic phases are separated and the organic phase is dried on $Na_2SO_4$, filtered and concentrated. The bromide excess is removed by distillation in vacuo. The expected compound (yield: quantitative) is thereby obtained, for which the characterizations by $^1H$, $^{13}C$ and $^{31}P$ NMR are given hereafter.

$^1H$ NMR (400 MHz, $CDCl_3$) δ (ppm): 0.77-0.89 (m, 12H); 1.16-1.28 (m, 27H); 1.63-1.70 (m, 1H); 1.74-1.83 (m, 1H); 2.68-2.76 (m, 1H); 2.70-2.90 (m, 1H); 3.01-3.18 (m, 2H); 3.50-3.75 (m, 3H); 4.01-4.13 (m, 6H);

$^{13}C$ NMR (100 MHz, $CDCl_3$) δ (ppm): 10.3; 10.5; 10.6; 10.9; 14.0; 14.1; 16.3; 16.4; 23.1; 23.5; 23.7; 24.0; 28.6; 28.7; 28.8; 28.9 30.2; 30.3; 30.6; 30.7; 32.7; 37.0; 37.1; 37.2; 37.3; 37.7-39.1 (d, J=132.0 Hz); 38.6; 38.7; 38.9; 50.2; 50.6; 50.9; 51.2; 51.9; 52.4; 60.8; 62.4; 62.5; 63.1; 63.2; 63.3; 167.4; 168.5; 171.3-171.5 (dd, J=18.5 Hz, d=4.5 Hz);

$^{31}P$ NMR (160 MHz, $CDCl_3$) δ (ppm): 23.1.

In a last step, noted as D in FIG. 3, ethyl 3-(N,N-di(2-ethylhexyl)-carbamoyl)-3-(diethoxy)phosphono)propanoate is subject to a saponification reaction in order to obtain the compound RT141.

This saponification is achieved by adding to a solution of 0.4 mol/L of ethyl 3-(N,N-di(2-ethylhexyl)carbamoyl)-3-(diethoxy)phosphono)propanoate in ethanol, a 20% soda solution (6 equiv.). The mixture is refluxed for 3 hours. After cooling, the mixture is acidified down to a pH of 1 by means of an aqueous hydrochloric acid solution at 1 mol/L, and then extracted twice with dichloromethane. The aqueous and organic phases are separated and the organic phase is dried on $Na_2SO_4$, filtered and concentrated. The expected compound (yield: quantitative) is thereby obtained for which the characterizations by $^1H$, $^{13}C$ and $^{31}P$ NMR are given hereafter.

$^1H$ NMR (400 MHz, $CDCl_3$) δ (ppm): 0.82-0.92 (m, 12H); 1.22-1.38 (m, 19H); 1.66-1.73 (m, 1H); 1.74-1.82 (m, 1H); 2.88-3.0 (m, 2H); 3.01-3.23 (m, 2H); 3.46-3.80 (m, 3H); 4.07-4.17 (m, 2H); 8.96 (ls, 2H);

$^{13}C$ NMR (100 MHz, $CDCl_3$) δ (ppm): 10.3; 10.5; 10.7; 10.8; 14.0; 16.2; 16.3; 23.0; 23.4; 23.6; 23.8; 28.5; 28.6; 28.7; 30.2; 30.3; 30.4; 32.9; 37.1; 37.7-39.0 (d, J=132.0 Hz); 38.5; 38.6; 50.4; 50.6; 52.3; 52.8; 62.4 168.8; 174.2 (d, J=9.0 Hz); 174.4 (d, J=9.0 Hz);

$^{31}P$ NMR (160 MHz, $CDCl_3$) δ (ppm): 24.0.

1.4—Grafting of the Compound RT141 on the Aminosilica

The aminosilica (1 equiv. of amine functions) and the compound RT141 (2 equiv.) are reacted in anhydrous THF in the presence of dicyclohexylcarbodiimide (DDC—2 equiv.), N-hydroxybenzotriazole (HOBt—2 equiv.) and of diisopropylethylamine (DIPEA—1.5 equiv.) for 48 hours, at room temperature and under an argon flow.

After which, the reaction medium is filtered, the residue is washed several times with dichloromethane and with methanol and is dried in vacuo at 90° C.

The material 1 is thereby obtained for which the characterizations by $^{13}C$, $^{31}P$ and $^{29}Si$ CPMAS NMR and the physico-chemical characteristics are given hereafter.

$^{13}$C NMR δ (ppm): 8.5; 11.73; 15.23; 22.39; 28.34; 37.23; 40.74; 48.30; 60.07; 172.44;

$^{31}$P NMR δ (ppm): 18.11;

$^{29}$Si NMR δ (ppm): −59.01; −66.05 (sites $T^2$ and $T^3$); −101.12; −110.01 (sites $Q^3$ and $Q^4$);

Pore diameter (BJH model): 5.5 nm;

BET specific surface area (nitrogen adsorption-desorption): 400 m$^2$/g;

Mass loss (ATG analysis): 19%;

Elementary analysis, found: C, 12.4%, N, 1.9%, P, 1.1%.

Amount of grafted molecules of the compound RT141: 0.46 mmol/g of material M1.

EXAMPLE 2

Preparation of a Second Organic-Inorganic Hybrid Material According to the Invention A second organic-inorganic hybrid material according to the invention is prepared, designated hereafter as material M2, which comprises a mesoporous carbon with a hexagonal periodic structure, of the CMK-3 type, on which are grafted organic molecules fitting the general formula (I) hereinbefore wherein:

m is 1;

v is 1 (and therefore w is 0);

$R^1$ and $R^2$ both represent a 2-ethylhexyl group, $R^3$ represents a group —CH$_2$—C—, $R^4$ represents an ethyl group, while $R^5$ represents a hydrogen atom.

This organic-inorganic hybrid material is prepared by the method illustrated in FIG. 2, which comprises:

(1) the functionalization of the mesoporous carbon with amine functions, which is achieved by a Diels-Alder reaction, i.e. by reacting conjugate diene functions of this carbon with alkynyl functions of propargylamine, noted as 9 in FIG. 2; and (2) the grafting of the compound RT141 on the amine functions of the thereby functionalized carbon which is achieved by peptide coupling like in Example 1 hereinbefore.

2.1— Synthesis of the Mesoporous Carbon

The mesoporous carbon is synthesized by following the operating procedure described by Jun et al. in *Journal of the American Chemical Society* 2000, 122, 10712-10713, reference [13]. It has pores with a diameter of 3.5 nm (as determined according to the BJH method) and a BET specific surface area of 1,400 m$^2$/g (as determined by adsorption-desorption of nitrogen).

2.2— Functionalization of the Mesoporous Carbon

The mesoporous carbon (0.5 g) is suspended in pure propargylamine. The mixture is placed in an autoclave heated to 100° C. for 48 hours. After which, it is washed with acetone in the Soxhlet for 48 hours.

The thereby obtained aminocarbon is dried in an oven (80° C.) for 20 hours.

Its physico-chemical characteristics are the following:

pore diameter (BJH method): 3.0 nm;

BET specific surface area (nitrogen adsorption-desorption): 600 m$^2$/g;

elementary analysis, found: N, 1.1%, P, 0%; O,: 2.6%.

amount of grafted amines: 0.79 mmol/g of mesoporous carbon.

2.3— Grafting of the Compound RT141 on the Aminocarbon

This grafting is achieved by following an operating procedure identical with the one described in Example 1 hereinbefore for grafting the compound RT141 on the aminosilica.

It leads to the material 2 for which the physico-chemical characteristics are the following:

pore diameter (BJH method): 2.8 nm;

BET specific surface area (nitrogen adsorption-desorption): 300 m$^2$/g;

elementary analysis, found: N, 1.3%, P, 0.9%; O, 3.9%.

amount of grafted RT141 molecules: 0.38 mmol/g of material M2.

EXAMPLE 3

Properties of the Organic-Inorganic Hybrid Materials According to the Invention 3.1— Capability of the Organic-Inorganic Hybrid Materials According to the Invention of Extracting Uranium(VI) from Phosphoric Media The capability of the materials M1 and M2, as obtained in Examples 1 and 2 hereinbefore, of extracting uranium(VI) from aqueous phosphoric media is appreciated by extraction tests which consist of:

mixing 250 mg of one of these materials as a powder with 10 mL of a synthetic solution of phosphoric acid containing either exclusively uranium(VI) or uranium (VI) and iron(III);

leaving the mixture for 24 hours with stirring (with the vortex), at room temperature (~25° C.); and then separating by filtration the solid and liquid phases of this mixture.

The concentrations of uranium(VI) and optionally of iron(III) are measured by X fluorescence in the synthetic solution of phosphoric acid before the latter is mixed with the material as well as in the filtrate.

Thus, for uranium(VI) and if required for iron(III) are determined:

the amount of these elements extracted per g of material, noted as $Q_{ext}$ and expressed in mg/g, which is determined by the following formula:

$$Q_{ext} = (C_{ini} - C_{fin}) \times \frac{V}{m}$$

with:

$C_{ini}$=initial concentration of the element in the synthetic solution of phosphoric acid (in mg/L);

$C_{fin}$=concentration of the element in the filtrate (in mg/L);

V=the volume of the synthetic solution of phosphoric acid mixed with the material (in L);

m=mass of material used in the test (in g);

the distribution coefficient, noted as $K_d$ and expressed in L/g, which is determined by the following formula:

$$Kd = \frac{Q_{ext}}{C_{fin}}$$

wherein $Q_{ext}$ and $C_{fin}$ have the same meaning as earlier.

In the case of tests having been conducted with a synthetic solution of phosphoric acid containing both uranium(VI) and iron(III), the selectivity coefficient of the material for uranium(VI) towards iron(III) is also determined. This coefficient which is noted as $S_{U/Fe}$ is determined by the following formula:

$$S_{U/Fe} = \frac{Kd_U}{Kd_{Fe}}$$

wherein $Kd_U$ is the distribution coefficient of the uranium (VI) while $Kd_{Fe}$ is the distribution coefficient of the iron(III).

Table I hereafter shows the results obtained with different synthetic solutions of phosphoric acid, for which the phosphoric acid concentration and the initial concentrations of uranium(VI) and of iron(III) have been varied.

Table II hereafter shows the stripped uranium(VI) concentrations, noted as $C_{str}$, by comparing them with the uranium concentrations having been extracted beforehand with the material M2, noted as $C_{ext}$.

TABLE II

| [HNO₃] (mol/L) | Uranium(VI) | |
|---|---|---|
| | $C_{ext}$ (mg/g) | $C_{str}$ (mg/g) |
| 1 | 150 | 50 |
| | 285 | 90 |

TABLE I

| Material | [H₃PO₄] (mol/L) | Uranium(VI) | | | | Fe(III) | | | | $S_{U/Fe}$ |
|---|---|---|---|---|---|---|---|---|---|---|
| | | $C_{ini}$ (mg/L) | $C_{fin}$ (mg/L) | $Q_{ext}$ (mg/g) | $Kd_U$ (L/g) | $C_{ini}$ (mg/L) | $C_{fin}$ (mg/L) | $Q_{ext}$ (mg/g) | $Kd_{Fe}$ (L/g) | |
| M1 | 0.1 | 504 | 185 | 12.76 | 0.069 | — | — | — | — | — |
| | | 429 | 147 | 11.28 | 0.077 | 2 845 | 2 793 | 2.08 | 0.0007 | 103 |
| | 1 | 268 | 94 | 6.96 | 0.074 | — | — | — | — | — |
| | | 526 | 283 | 9.72 | 0.034 | — | — | — | — | — |
| | | 374 | 188 | 7.44 | 0.040 | 3 295 | 3 261 | 1.36 | 0.0004 | 95 |
| M2 | 0.1 | 535 | 64 | 18.84 | 0.294 | — | — | — | — | — |
| | 1 | 250 | 100 | 6 | 0.060 | — | — | — | — | — |
| | | 490 | 205 | 11.40 | 0.056 | — | — | — | — | — |

These results show that for an initial concentration of uranium(VI) of 500 ppm and for a phosphoric acid concentration of 0.1 mol/L, 1 kg of material M1 allows extraction of about 13 g of uranium(VI) while 1 kg of material M2 allows extraction of about 19 g of uranium(VI). When the phosphoric acid concentration increases by a factor 10 (1 mol/L), the extracted amount of uranium(VI) drops but remains however very high since it is of about 10 g for material M1 and of about 11 g for material M2.

Moreover, they show that the presence of iron(III) does not have any real influence on the extraction of uranium(VI) by the materials and that the selectivity of the latter towards uranium with respect to the iron is highly satisfactory. Indeed, the selectivity coefficient $S_{U/Fe}$ is of the order of 100 (which means that the uranium is 100 times better extracted than iron) including when the ratio of the initial concentrations Fe/U is close to 10.

Finally, these results show the fact that the inorganic support is a carbon rather than a silica (or vice versa) does not notably modify the efficiency of the extraction of uranium(VI) in an aqueous phosphoric medium.

3.2— Stripping of the Uranium(VI) from an Organic-Inorganic Hybrid Material According to the Invention The possibility of stripping from the material M2 the uranium having been extracted beforehand with this material is appreciated by tests which consist of:

- mixing 250 mg of one of the materials M2, as obtained at the end of the extraction tests described in point 3.1 hereinbefore, with 10 ml of a potash solution at 0.5 mol/L;
- leaving the mixture for 24 hours with stirring (with the vortex), at room temperature (~25° C.);
- separating by filtration the solid and liquid phases of this mixture; and then
- measuring the uranium(VI) concentration of the filtrate by X fluorescence.

This table shows that about ⅓ of the uranium having been extracted with the material M2 is stripped from this material after a single stripping cycle with potash for 24 hours, which is very satisfactory. These results actually suggest that it should be possible to optimize the stripping of the uranium by submitting the material to several successive stripping cycles.

CITED REFERENCES

[1] Hurst et al., *Industrial & Engineering Chemistry Process Design and Development* 1972, 11(1), 122-128
[2] Gonzalez-Luque and Streat, *Hydrometallurgy* 1983, 11(2), 207-225
[3] Ketzinel, patent U.S. Pat. No. 4,599,221
[4] Kabay et al., *Industrial & Engineering Chemistry Research* 1998, 37(5), 1983-1990
[5] Donia et al., *International Journal of Mineral Processing* 2011, 101(1-4), 81-88
[6] Sadeghi et al., *Microchemica Acta* 2012, 178(1-2), 89-97
[7] Ahmed et al., *Hydrometallurgy* 2013, 134-135(0), 150-157
[8] Lebed et al., *Chemistry of Materials* 2012, 24(21), 4166-4176
[9] Yuan et al., *Dalton Transactions* 2011, 40(28), 7446-7453
[10] Fryxell et al., *Environmental Science & Technology* 2005, 39(5), 1324-1331
[11] Yuan et al., *Journal of Materials Chemistry* 2012, 22(33), 17019-17026
[12] Zhao et al., *Science* 1998, 279, 548-552
[13] Jun et al., *Journal of the American Chemical Society* 2000, 122, 10712-10713

What is claimed is:

1. An organic-inorganic hybrid material, which comprises an inorganic solid support on which is covalently grafted a plurality of organic molecules of formula (I):

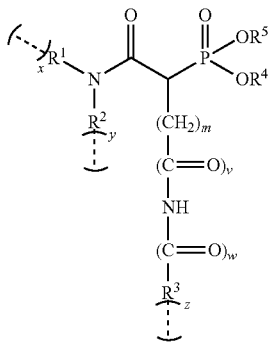

(I)

wherein:
- x, y and z are equal to 0 or 1, with the proviso that at least one of x, y and z is equal to 1;
- m is an integer ranging from 1 to 6;
- v and w are equal to 0 or 1, with the proviso that v is equal to 1 when w is equal to 0 and v is equal to 0 when w is equal to 1;
- if x is equal to 0, $R^1$ represents a hydrogen atom or a linear or branched, saturated or unsaturated hydrocarbon group comprising from 1 to 12 carbon atoms, and, if x is equal to 1, $R^1$ represents a group bound to the inorganic solid support through at least one covalent bond represented by the dotted line;
- if y is equal to 0, $R^2$ represents a hydrogen atom or a linear or branched, saturated or unsaturated hydrocarbon group comprising from 1 to 12 carbon atoms, and, if y is equal to 1, $R^2$ represents a group bound to the inorganic solid support through at least one covalent bond represented by the dotted line;
- if z is equal to 0, $R^3$ represents a hydrogen atom or a linear or branched, saturated or unsaturated hydrocarbon group comprising from 1 to 12 carbon atoms, and, if z is equal to 1, $R^3$ represents a group bound to the inorganic solid support through at least one covalent bond represented by the dotted line;
- $R^4$ and $R^5$ represent, independently of each other, a hydrogen atom, a linear or branched, saturated or unsaturated hydrocarbon group comprising from 2 to 8 carbon atoms, or a monocyclic aromatic group.

2. The organic-inorganic hybrid material of claim 1, wherein the inorganic solid support comprises a metal oxide, a mixed metal oxide, a mixture of metal oxides, or carbon.

3. The organic-inorganic hybrid material of claim 1, wherein the inorganic solid support is a porous material.

4. The organic-inorganic hybrid material of claim 3, wherein the porous material is a mesoporous or macroporous material.

5. The organic-inorganic hybrid material of claim 4, wherein the porous material is a mesoporous silica, a mesoporous titanium oxide, a mesoporous zirconia or a mesoporous carbon.

6. The organic-inorganic hybrid material of claim 5, wherein the inorganic solid support is a SBA mesoporous silica or a CMK mesoporous carbon.

7. The organic-inorganic hybrid material of claim 1, wherein $R^3$ represents —$(CH_2)_q$—$X^1$— wherein q is an integer ranging from 0 to 12, and $X^1$ represents a group selected from the group consisting of:

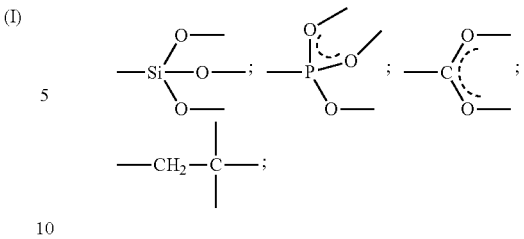

and —CH=CH—.

8. The organic-inorganic hybrid material of claim 1, wherein at least one of $R^1$ and $R^2$ represents a group of formula (a), (b), (c), (d), (e), (f) or (g):

—$(CH_2)_p$—C(O)—NH—$(CH_2)_q$—$X^2$—  (a)

—$(CH_2)_p$—NH—C(O)—$(CH_2)_q$—$X^2$—  (b)

—$(CH_2)_p$—C(O)—O—$(CH_2)_q$—$X^2$—  (c)

—$(CH_2)_p$—O—C(O)—$(CH_2)_q$—$X^2$—  (d)

—$(CH_2)_p$—O—$(CH_2)_q$—$X^2$—  (e)

—$(CH_2)_p$-triazole-$(CH_2)_q$—$X^2$—  (f)

—$(CH_2)_q$—$X^2$—  (g)

wherein p is an integer ranging from 1 to 6, q is an integer ranging from 0 to 12, and $X^2$ represents a group selected from the group consisting of:

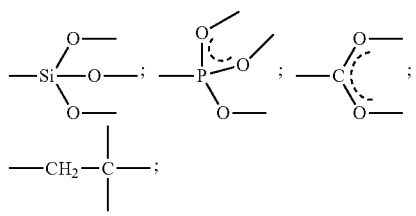

and —CH=CH—.

9. The organic-inorganic hybrid material of claim 8, wherein $R^3$ represents —$(CH_2)_q$—$X^1$— wherein q is an integer ranging from 0 to 12 and $X^1$ is identical with $X^2$.

10. The organic-inorganic hybrid material of claim 1, wherein the organic molecules have the formula (Ia):

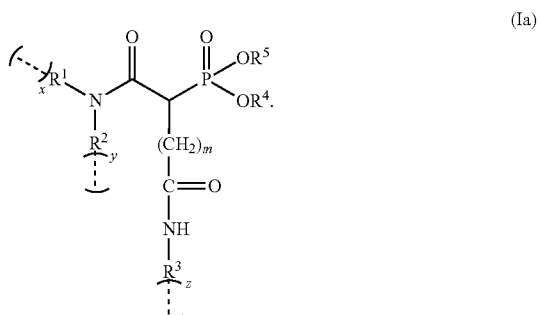

(Ia)

11. The organic-inorganic hybrid material of claim 10, wherein x and y are 0, $R^1$ and $R^2$ represent, independently of each other, a linear or branched alkyl group comprising from 1 to 12 carbon atoms; z is 1 and $R^3$ represents a group bound to the inorganic solid support through at least one covalent bond, and $R^4$ and $R^5$ represent, independently of each other, a hydrogen atom or a linear or branched alkyl group comprising from 2 to 8 carbon atoms.

12. The organic-inorganic hybrid material of claim 11, wherein $R^1$ and $R^2$ are identical with each other and represent a branched alkyl group comprising from 6 to 12 carbon atoms.

13. The organic-inorganic hybrid material of claim 11, wherein $R^4$ and $R^5$ represent, independently of each other, a hydrogen atom or a linear or branched alkyl group comprising from 2 to 4 carbon atoms.

14. The organic-inorganic hybrid material of claim 10, wherein the inorganic solid support is based on a metal oxide, a mixed metal oxide or on a mixture of metal oxides and $R^3$ represents:

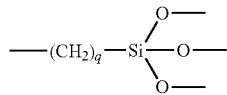

wherein q is 1 to 5.

15. The organic-inorganic hybrid material of claim 10, wherein the inorganic solid support is based on carbon and $R^3$ represents:

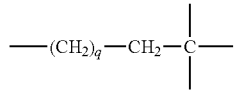

wherein q is 1 to 5.

16. A method for extracting uranium(VI) from an aqueous medium comprising phosphoric acid comprising contacting the aqueous medium with the organic-inorganic hybrid material of claim 1 and then separating the aqueous medium and the organic-inorganic hybrid material.

17. The method of claim 16, wherein the aqueous medium comprises from 0.012 mol/L to 9 mol/L of phosphoric acid.

18. The method of claim 17, wherein the aqueous medium results from the attack of a phosphate ore with sulfuric acid.

19. A method for recovering uranium(VI) from an aqueous medium comprising phosphoric acid, comprising:

extraction of uranium(VI) from the aqueous medium, the extraction comprising contacting the aqueous medium with the organic-inorganic hybrid material of claim 1, and then separating the aqueous medium and the organic-inorganic hybrid material; and stripping of uranium(VI) from the organic-inorganic hybrid material obtained at the end of the extraction, the stripping comprising contacting the organic-inorganic hybrid material with a basic aqueous solution, and then separating the organic-inorganic hybrid material and the basic aqueous solution.

20. The method of claim 19, wherein the aqueous medium results from the attack of a phosphate ore with sulfuric acid.

* * * * *

UNITED STATES PATENT AND TRADEMARK OFFICE
CERTIFICATE OF CORRECTION

PATENT NO. : 10,130,932 B2  
APPLICATION NO. : 14/769846  
DATED : November 20, 2018  
INVENTOR(S) : Sabah El Mourabit et al.

Page 1 of 1

It is certified that error appears in the above-identified patent and that said Letters Patent is hereby corrected as shown below:

In the Specification

Column 6, Line 60, "—CH₂—C—;" should read -- —CH₂—C—; and —CH=CH—. --

Signed and Sealed this  
Twenty-sixth Day of March, 2019

Andrei Iancu  
*Director of the United States Patent and Trademark Office*